US007399960B2

(12) United States Patent
Yamaguchi

(10) Patent No.: US 7,399,960 B2
(45) Date of Patent: Jul. 15, 2008

(54) TIME OF FLIGHT MASS SPECTROMETER

(75) Inventor: Shinichi Yamaguchi, Kyoto-fu (JP)

(73) Assignee: Shimadzu Corporation, Kyoto (JP)

( * ) Notice: Subject to any disclaimer, the term of this patent is extended or adjusted under 35 U.S.C. 154(b) by 226 days.

(21) Appl. No.: 11/333,214

(22) Filed: Jan. 18, 2006

(65) Prior Publication Data

US 2008/0006768 A1 Jan. 10, 2008

(30) Foreign Application Priority Data

Jan. 20, 2005 (JP) ............................ 2005-012210

(51) Int. Cl.
*B01D 59/44* (2006.01)

(52) U.S. Cl. ...................... 250/287; 250/286; 250/281; 250/290; 250/291; 250/293

(58) Field of Classification Search .......... 250/281–300
See application file for complete search history.

(56) References Cited

U.S. PATENT DOCUMENTS 6,828,553 B2 * 12/2004 Weiss ......................... 250/287
6,900,431 B2 * 5/2005 Belov et al. ................. 250/282

(Continued)

FOREIGN PATENT DOCUMENTS

JP 11-135060 5/1999

(Continued)

OTHER PUBLICATIONS

Morio Ishihara et al., "Perfect space and time focusing ion optics for multiturn time of . . . ", International Journal of Mass Spectrometry 197 (2000) 179-189.

*Primary Examiner*—Jack I. Berman
*Assistant Examiner*—Andrew Smyth
(74) *Attorney, Agent, or Firm*—Westerman, Hattori, Daniels & Adrian, LLP.

(57) ABSTRACT

A time of flight mass spectrometer according to the present invention includes: a) an ion source at which an ion starts flying; b) an energizer for giving a predetermined amount of energy to the ion to let the ion start flying from the ion source; c) an ion guide for forming a time-focusing flight path on which the ion flies once or repeatedly; d) a detector for detecting the ion after flying the flight path; e) an analysis controller for giving different amounts of energy to ions of the same kind using the energizer, and for measuring the values of the flight time of the ions from the ion source to the detector for the amount of energy; and f) a mass calculator for calculating or estimating the mass to charge ratio of the ion based on the difference in the values of the flight time of the ions. Since the flight time of ions on the time-focusing flight path does not depend on their kinetic energy, the difference in the flight time of an ion having two different amounts of energy gives the estimation of the mass to charge ratio of the ion. Thus, a mass spectrometry of an ion for a wide range of mass to charge ratio can be made by simply performing two measurements on the same sample. This greatly reduces the time and labor of mass analysis, and a wide range of mass spectrum can be obtained on a scarce sample on which many-time measurements are impossible.

7 Claims, 3 Drawing Sheets

U.S. PATENT DOCUMENTS

| | | | | |
|---|---|---|---|---|
| 6,906,321 | B2 * | 6/2005 | Yamaguchi | 250/287 |
| 2003/0132377 | A1 * | 7/2003 | Bateman et al. | 250/281 |
| 2004/0183007 | A1 * | 9/2004 | Belov et al. | 250/287 |
| 2005/0001163 | A1 * | 1/2005 | Belov et al. | 250/290 |
| 2007/0029473 | A1 * | 2/2007 | Verentchikov | 250/281 |

FOREIGN PATENT DOCUMENTS

| | | |
|---|---|---|
| JP | 11-195398 | 7/1999 |

* cited by examiner

Fig. 1
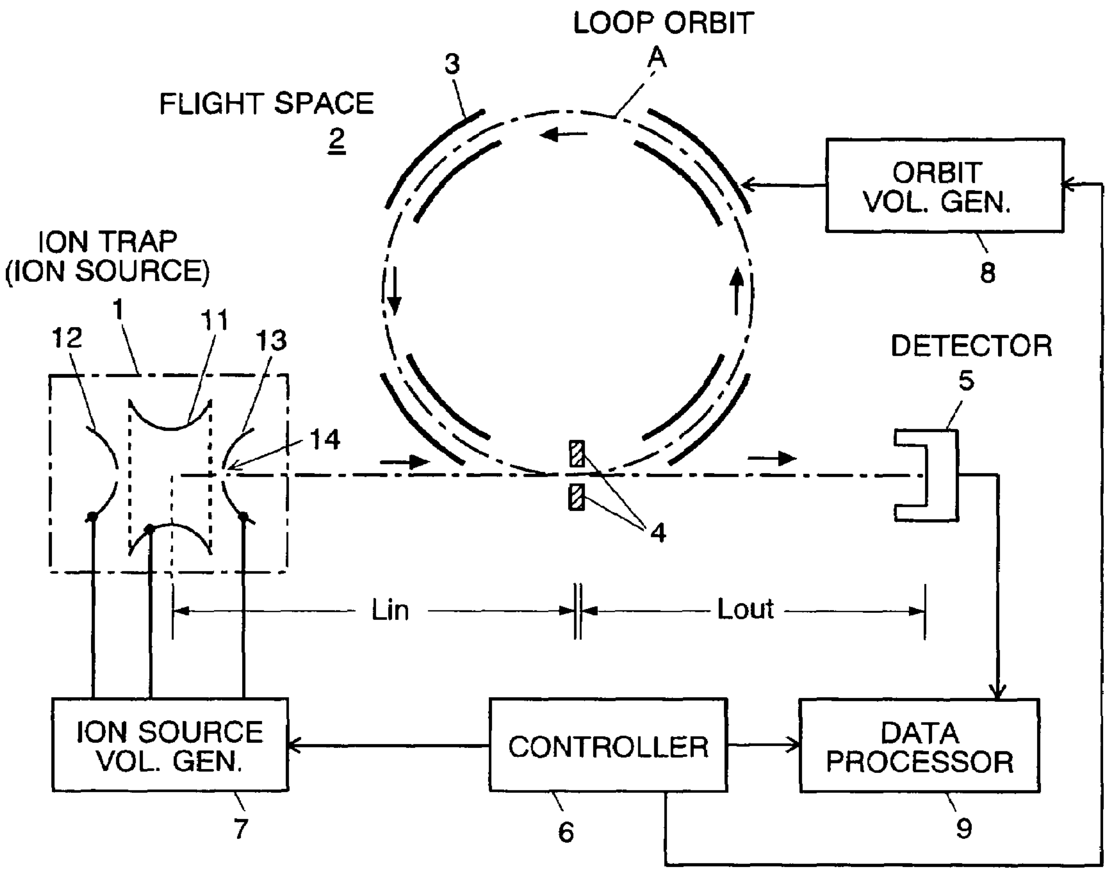
Fig. 2A
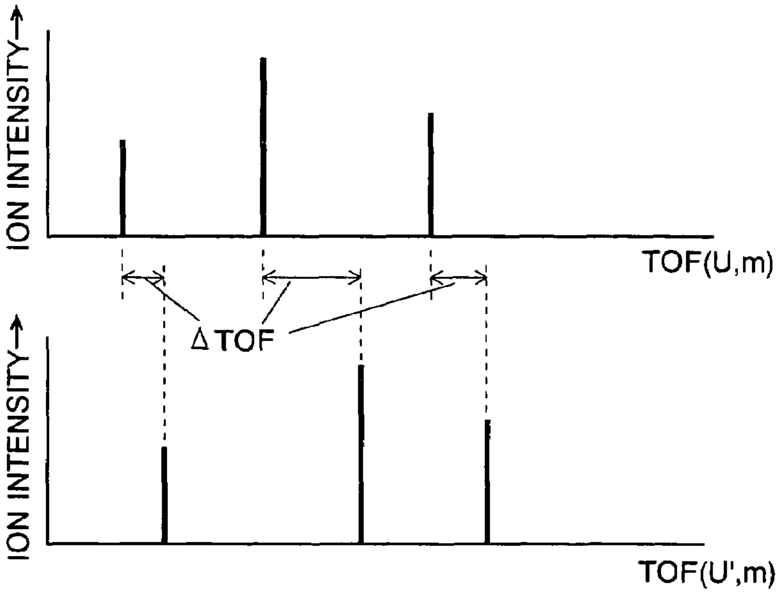
Fig. 2B

"8" SHAPED LOOP ORBIT

STRAIGHT RECIPROCAL ORBIT

CURVED RECIPROCAL ORBIT

TIME OF FLIGHT MASS SPECTROMETER

The present invention relates to a time of flight mass spectrometer (TOFMS), especially to one that includes a flight space in which ions to be analyzed fly on almost the same loop orbit or reciprocal orbit repeatedly.

BACKGROUND OF THE INVENTION

In a general TOFMS, ions accelerated by an appropriate electric field are injected into a flight space where no electric field or magnetic field is present. The ions are separated by their mass to charge ratios according to the flight time until they reach and are detected by a detector. Since the difference in the flight time of two ions having different mass to charge ratios is larger as the flight path is longer, it is preferable to design the flight path as long as possible in order to enhance the resolution of the mass to charge ratio of a TOFMS. In many cases, however, it is difficult to incorporate a long straight path in a TOFMS due to the limited overall size, so that various measures have been taken to effectively lengthen the flight length.

In the Japanese Unexamined Patent Publication No. H11-135060, a TOFMS is disclosed in which an "8" shaped loop orbit is formed, and ions are guided to fly the loop orbit many times so that a long flight path is achieved.

A problem of such an orbit construction is explained using FIG. 4, which illustrates a simple circular orbit instead of an "8" shaped loop orbit for simplicity.

An ion starting the ion source 1 is introduced into the flight space 2 by the gate electrodes 4, and guided along the loop orbit A in the flight space 2. For the visibility of FIG. 4, the electrodes for producing the electric fields to guide the ion along the loop obit A is omitted. After flying the loop orbit A either once or many times, the ion leaves the loop orbit A when it passes the gate electrodes 4 to which an appropriate departing voltage is applied. After leaving the loop orbit A, the ion arrives at the detector 5, where the ion is detected, and the arriving time is measured. Since the flight distance of the ion is longer as the number of turns in the loop orbit A is greater, the difference in the flight time of ions having different mass to charge ratios becomes larger, and it becomes easier to discriminate between ions having close mass to charge ratios. But it sometimes happens that ions having smaller mass to charge ratios catch up with ions having larger mass to charge ratios while they turn the loop orbit A a number of times, and both ions enter the detector almost at the same time, since ions having smaller mass to charge ratios move faster.

It means that, in such a TOFMS, ions having smaller difference in the mass to charge ratio can be adequately separated, but ions having larger difference in the mass to charge ratio are sometimes difficult to separate. In order to avoid such a situation, conventionally the voltage applied to the gate electrodes 4 is controlled so that the mass to charge ratios of ions introduced into the loop orbit A are limited within a certain range. This prevents ions having large difference in mass to charge ratio being detected in a measurement. When ions having a wide range of mass to charge ratios, i.e. from smaller mass to charge ratios to larger mass to charge ratios, are to be measured, several measurement should be repeated to cover the range. Unless enough amount of sample is available, it is impossible to measure the whole range of mass to charge ratios.

Instead of using a loop orbit, the flight distance of ions can be made longer by reciprocating ions along a linear or curved path. But the same problem as discussed above occurs in such a case.

SUMMARY OF THE INVENTION

The present applicant proposes a new TOFMS addressing the problem described above in the Japanese Patent Application No. 2004-209576 (which corresponds to the U.S. Pat. No. 6,906,321). In the new TOFMS, two detectors, for example, are placed at appropriate respective distances from the exit of the loop orbit A (i.e. gate electrodes 4 in FIG. 4) to give different flight lengths between the exit and the detector. Two measurements are made on ions of the same sample in which the two detectors are used respectively. Since the flight distances differ though the length of the loop orbit is the same, there is a difference in the flight time of the two measurements, and the difference depends on the mass to charge ratio of the ion. Based on the difference in the flight time, the number of turns in the loop orbit (i.e. the range of the mass to charge ratio of the ions) can be assumed, and an accurate mass to charge ratio of the ions can be determined.

Some variations are possible to the above TOFMS. But, in many cases, additional hardware is necessary to vary the exit flight distance outside the loop orbit, i.e. from the exit of the loop orbit to the detector, or from the ion source to the entrance of the loop orbit (which is the gate electrodes 4 in FIG. 4).

An object of the present invention is, therefore, to provide a TOFMS that can measure a wide range of mass to charge ratios while providing a long flight distance with a simpler structure.

A time of flight mass spectrometer according to the present invention includes:

a) an ion source at which an ion starts flying;

b) an energizer for giving a predetermined amount of energy to the ion to let the ion start flying from the ion source;

c) an ion guide for forming a time-focusing flight path on which the ion flies once or repeatedly;

d) a detector for detecting the ion after flying the flight path;

e) an analysis controller for giving different amounts of energy to ions of the same kind using the energizer, and for measuring the values of the flight time of the ions from the ion source to the detector for the amounts of energy; and f) a mass calculator for calculating or estimating the mass to charge ratio of the ion based on the difference in the values of the flight time of the ions.

The "time-focusing flight path" means that the flight time of ions having the same mass to charge ratio but different amounts of energy is the same when the ions fly the flight path once or repeatedly. The flight path can have any shape as long as it provides a long flight path of ions in a small space: for example it may be a loop orbit such as circular, oval, or "8" shaped orbit on which ions fly repeatedly, or it may be a straight or curved path on which ions reciprocate, as shown in FIG. 5. The ion source of the present invention may be one that produces ions in itself, or one that holds ions produced in another place.

In the time of flight mass spectrometer of the present invention, the flight path of an ion is composed of three parts: an approaching path which is the path from the ion source to the time-focusing flight path; the time-focusing flight path formed by the ion guide; and a departing path which is the path from the flight path to the detector. Ions fly the time-focusing flight path repeatedly, where the flight time of the ions is almost the same, irrespective of their kinetic energy as long as their mass to charge ratio is the same. That is, the flight time of ions on the flight path does not depend on their kinetic energy. It is already known that the time-focusing properties of a flight path can be obtained by using a sector-form electric field or other form of electric field to form an "8" shaped flight path. The Japanese Unexamined Patent Publication No. H11-195398 and "Perfect space and time focusing ion optics for multitum time of flight mass spectrometers", Morio Ishihara et al., International Journal of Mass Spectrometry, 197(2000), pp.179-189 discuss the production of a time-focusing flight path.

On the contrary, the approaching path and the departing path, which are typically straight (or may be curved), do not have the time-focusing properties with respect to the kinetic energy of ions, so that the flight time of ions on the paths varies depending on their kinetic energy even if their mass to charge ratio is the same. That is, the difference in the flight time of an ion of two different states, where the values of the kinetic energy are different, depends on the speeds of the respective states of the ion, and the speed of an ion depends on its kinetic energy and its mass to charge ratio. Since the value of kinetic energy given to an ion by an energizer is known, the mass to charge ratio of the ion can be obtained by measuring the two values of flight time of the ion in two states, and calculating the difference of the two values.

According to the time of flight mass spectrometer of the present invention, a mass spectrometry of an ion for a wide range of mass to charge ratio can be made by simply performing two measurements on the same sample. This greatly reduces the time and labor of mass analysis, and a wide range of mass spectrum can be obtained on a scarce sample on which many measurements are impossible.

Generally, an energizer pushes ions out of an ion source using the repulsive force of an electric field against ions of the same polarity, or pulls ions out of an ion source using the attracting force of an electric field against ions of the opposite polarity. Anyway, an energizer is necessary to an ion source to eject ions from it. The value of the kinetic energy of an ion can be controlled by simply tuning the voltage for forming the electric field of the ion source. This means that no additional hardware is necessary to a conventional TOFMS having loop orbit or reciprocal orbit for practicing the present invention.

BRIEF DESCRIPTION OF THE DRAWINGS

FIG. 1 is a schematic diagram of a time of flight mass spectrometer as an embodiment of the present invention.

FIGS. 2A and 2B are graphs of TOF(m,U) (flight time) vs. ion intensity with different amounts of kinetic energy.

DETAILED DESCRIPTION OF A PREFERRED EMBODIMENT

Figure 4:
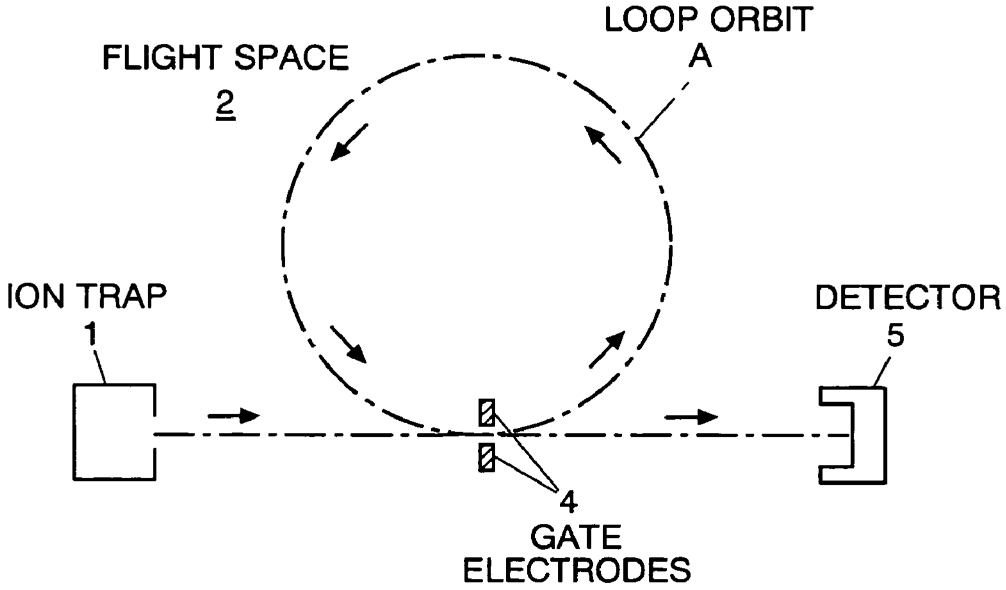
Fig. 4 PRIOR ART
FIG. 4 is an explanatory diagram of the flight path of an ion from an ion source to a detector in a conventional loop orbit time of flight mass spectrometer.
Figure 5:
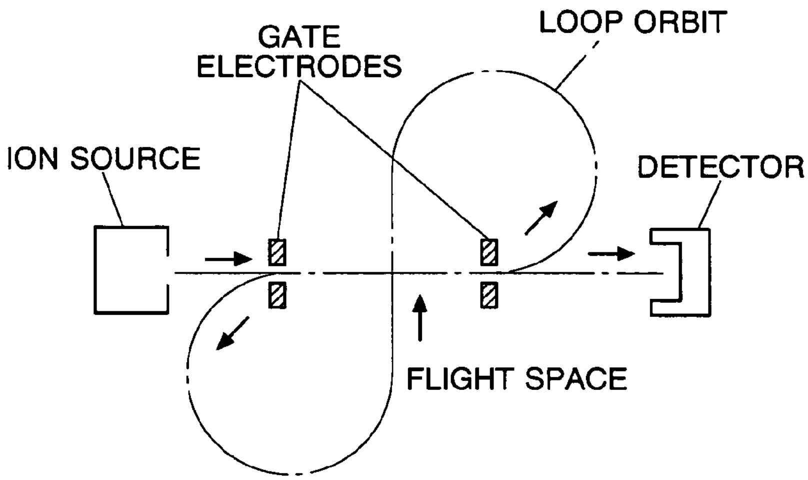
FIG. 5 shows examples of loop orbits and reciprocal paths usable in the present invention.
Figure 5:
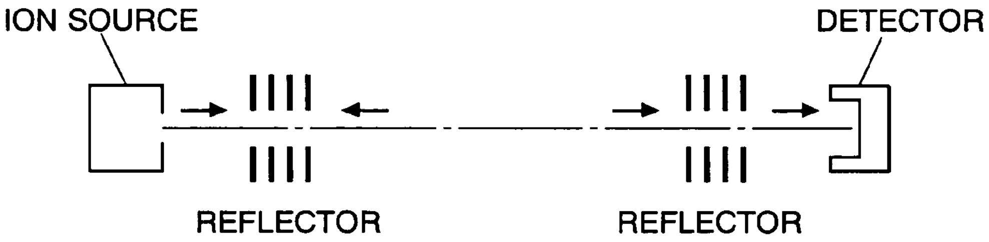
Figure 5:
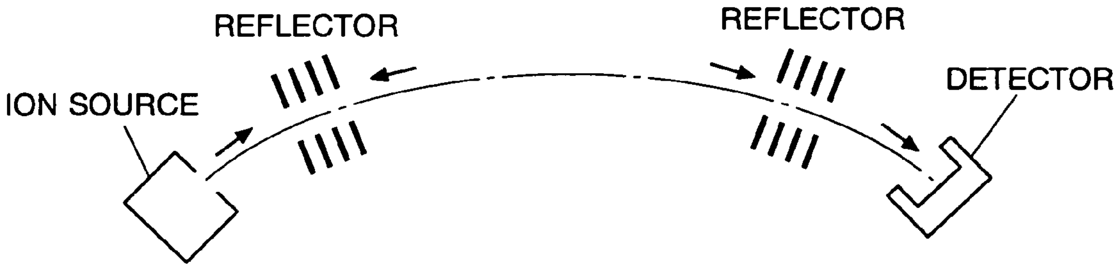

A TOFMS embodying the present invention is described referring to the attached drawings. FIG. 1 shows a schematic diagram of the TOFMS of the embodiment, in which the same numerals are used for the same elements as shown in FIG. 4.

The TOFMS of the present embodiment uses a three-dimensional quadrupole ion trap 1 as the ion source. The ion trap 1 is composed of a ring electrode 11 and a pair of end cap electrodes 12, 13 placed opposite each other with the ring electrode between them. Appropriate voltages are applied from an ion source voltage generator 7 to the ring electrode 11 and the end cap electrodes 12, 13 to form a quadrupole electric field for trapping, or containing, ions in the space surrounded by the three electrodes 11, 12 and 13. Ions can be generated inside the ion trap, or they can be generated in another ion source (not shown) outside of the ion trap 1, and introduced into the ion trap 1. The ions trapped in the ion trap 1 are given a certain amount of kinetic energy when the voltage applied to the electrodes 11, 12 and 13 from the ion source voltage generator 7 are changed, and ejected from an ion exit 14 provided in one of the end cap electrodes 12, 13.

In a flight space 2, a plurality of pairs of guide electrodes 3 and a pair of gate electrodes 4 are provided. The gate electrodes 4 are used to put ions introduced into the flight space 2 to a loop orbit A, and also to put ions flying on the loop orbit A out of the loop orbit A. Appropriate driving voltages are applied from an orbit voltage generator 8 to the gate electrodes 4 and the guide electrodes 3. Though the loop orbit A of FIG. 1 is circular, it can be oval, "8" shaped or any other shape of a closed loop, and further it can be spiral, helical or reciprocal, as long as it is time focusing with respect to the kinetic energy of ions.

The basic operation of the TOFMS of FIG. 1 is as follows. The ions trapped and held in the ion trap 1 are given a preset amount of kinetic energy by the voltage applied from an ion source voltage generator 7 to the electrodes 11, 12 and 13, so that the ions are ejected from the ion trap 1 through the ion exit 14. The ejected ions first fly straight to the gate electrodes 4, and are introduced to the flight space 2 and put to the loop orbit A by the gate electrodes 4. After flying on the loop orbit A one turn or several turns owing to the electric field generated by the guide electrodes 3, the ions are put out of the loop orbit A, or out of the flight space 2, by the gate electrodes 4, and fly straight to a detector 5. The incoming ions give rise to an electric current in the detector 5, which makes a detection signal. The detection signal is sent to a data processor 9.

The principle of calculating the mass to charge ratio of an ion characteristic to the TOFMS of the present embodiment is explained. The symbols are defined as follows.

Lin: distance (approaching distance) between the ion trap 1 and the entrance (i.e. gate electrodes 4) of the loop orbit A Lout: distance (departing distance) between the exit (i.e. gate electrodes 4) of the loop orbit A and the detector 5

U: kinetic energy of an ion

C: circumference of a loop orbit A m: mass to charge ratio of an ion

TOF(m,U): flight time of an ion having kinetic energy U and mass to charge ratio m (from the ion trap 1 to the detector 5)

V(m,U): speed of an ion having kinetic energy U and mass to charge ratio m

N(m): number of turns on the loop orbit A of an ion having mass to charge ratio m From the basic principle of a TOFMS, the following equation (1) stands.

$$TOF(m,U) \times V(m,U) = L\text{in} + N(m) \times C + L\text{out} \quad (1)$$

If an ion is not put on the loop orbit A at the gate electrodes 4, the path from the ion trap 1 to the detector 5 is regarded as a normal straight flight space, in which case the flight distance L is, L=Lin +Lout.

The equation (1) can be rewritten as $$TOF(m,U) = \{L + N(m) \times C\} / V(m,U) \quad (2)$$

Since the loop orbit A has time-focusing properties for ions having the same mass to charge ratio m, the flight time on the loop orbit A does not depend on the kinetic energy of the flying ions. Thus the change in the flight time ΔTOF(m) when the kinetic energy of an ion having mass to charge ratio m is changed from U to U' is given by $$\Delta TOF(m)=TOF(m,U)-TOF(m,U')=L\{1/V(m,U)-1V(m,U')\} \quad (3)$$

The equation (3) shows that the difference ΔTOF(m) in the flight time of ions depends on the speed of the ions. Since the speed V, the kinetic energy U and the mass to charge ratio m of an ion bear the relationship $$V(m,U)=(2U/m)^{(-1/2)},$$

the mass to charge ratio m can be calculated from the equation (3) as $$m=2\times\Delta TOF(m)^2\times(U^{(-1/2)}-U'^{(-1/2)})^{-2}/L^2 \quad (4)$$

This shows that, by measuring the difference ΔTOF of the flight time of an ion when the kinetic energy of the ion is changed, the mass to charge ratio m of the ion can be determined.

An operation of the TOFMS of the present embodiment is described. A controller 6 determines an appropriate voltage, and controls the ion source voltage generator 7 to apply the voltage to the electrodes of the ion trap 1. Owing to the voltage, ions held in the ion trap 1 are ejected with the first kinetic energy U, and a first measurement on the ions is conducted as explained above. The data processor 9 generates a graph of the relationship between the flight time TOF(m,U) and the intensity of ions as shown in FIG. 2A. Then the controller 6 determines another appropriate voltage to give ions held in the ion trap 1 the second kinetic energy U', and conducts a second measurement on the ions thus ejected. The data processor 9 generates another graph of flight time TOF (m,U') and the intensity of ions as shown in FIG. 2B.

Since the two measurements described above are conducted on the same sample, the intensity of ions of the same kind should be almost the same in the graphs of FIG. 2A and 2B. By comparing the peaks of the two graphs, peaks of the same ions can be found, and the values of flight time TOF1 and TOF2 of the same ion can be determined respectively. Since the kinetic energies U and U' can be calculated, and the flight distance L of the straight path is known, the data processor 9 can calculate the mass to charge ratio n of the ion from the difference ΔTOF(m) between TOF1 and TOF2 using the equation (4).

Thus, principally, the mass to charge ratio m of an object ion can be calculated based on the difference ΔTOF(m), but the precision of the calculation depends on the length L of the straight path. In such a device, however, it is difficult to provide a long distance L within the device, so that it is difficult to calculate the mass to charge ratio m at high precision.

The TOFMS of the present embodiment can be used to estimate a rough value of the mass to charge ratio m and restrict the range of the mass to charge ratio m of an object ion, rather than to calculate a precise value of mass to charge ratio m of the object ion, from the difference ΔTOF(m).

Figure 3:
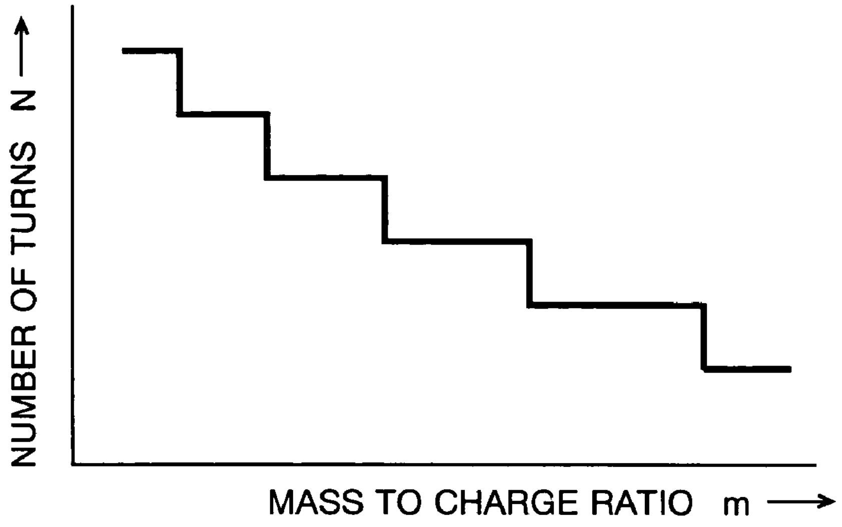
FIG. 3 is a graph showing the relationship between the mass to charge ratio of an ion and the number of turns in a loop orbit of the ion.

In the TOFMS of the above structure, the mass to charge ratio m and the number of turns N(m) of an ion have the steplike relationship as shown in FIG. 3. The mass to charge ratios m within the same level of step can be calculated precisely by measuring the flight time of an ion given a predetermined kinetic energy. But it is difficult to determine whether the detected ions have flown the same number of turns or different number of turns (i.e. the ions belong to the same level of step in FIG. 3 or to different levels). If, owing to the TOFMS of the present embodiment, a rough estimation, or range, of the mass to charge ratios m can be obtained from the difference ΔTOF(m) of the flight time, the precise value of mass to charge ratio m can be calculated after the ions are separated with their ranges. Thus the data processor 9 can determine the mass to charge ratio m of ions of a wide range with two measurements on the same sample.

Although only an exemplary embodiment of the present invention has been described in detail above, those skilled in the art will readily appreciated that many modifications are possible in the exemplary embodiment without materially departing from the innovative teachings and advantages of this invention. For example, the ion source of the present invention is not limited to an ion trap as in the above embodiment. If an ion source according to the electron impact (EI) ionization method is used, the repeller electrode provided in the ionizing chamber, the drawing electrode provided outside the ionizing chamber and the voltage generator for applying voltage between them are the energizer of the present invention.

What is claimed is:

1. A time of flight mass spectrometer comprising:

a) an ion source at which an ion starts flying;

b) an energizer for giving a predetermined amount of energy to the ion to let the ion start flying from the ion source;

c) an ion guide for forming a flight path on which the ion flies once or repeatedly in a time-focusing manner;

d) a detector for detecting the ion after flying the flight path repeatedly;

e) an analysis controller for giving two different amounts of energy to ions of a same kind using the energizer, and for measuring values of flight time of the ions from the ion source to the detector for the two amounts of energy respectively; and f) a mass calculator for calculating or estimating the mass to charge ratio of the ion of the same kind based on the difference in the values of the flight time of the ions of the same kind given two different amounts of energy.

2. The time of flight mass spectrometer according to claim 1, wherein the ion source is a three-dimensional quadrupole ion trap.

3. The time of flight mass spectrometer according to claim 1, wherein the ion guide forms a flight path of a circular orbit.

4. The time of flight mass spectrometer according to claim 1, wherein the ion guide forms a flight path of an "8" shaped loop orbit.

5. The time of flight mass spectrometer according to claim 1, wherein the ion guide forms a flight path of a straight reciprocal path.

6. The time of flight mass spectrometer according to claim 1, wherein the ion guide forms a flight path of a curved reciprocal path.

7. The time of flight mass spectrometer according to claim 1, wherein the ion source is an electron impact (EI) ionizer, in which a repeller electrode provided in an ionizing chamber, a drawing electrode provided outside the ionizing chamber and a voltage generator for applying voltage between them constitute the energizer.

* * * * *